Oct. 13, 1959

R. C. RISNER 2,908,527

AUTOMOBILE CARRIERS

Filed April 11, 1957

INVENTOR
ROBERT C. RISNER

BY Ogle R. Singleton

ATTORNEY

Oct. 13, 1959     R. C. RISNER     2,908,527
AUTOMOBILE CARRIERS
Filed April 11, 1957     6 Sheets-Sheet 2

INVENTOR
ROBERT C. RISNER
BY *Ogle P. Singleton*
ATTORNEY

Oct. 13, 1959     R. C. RISNER     2,908,527
AUTOMOBILE CARRIERS

Filed April 11, 1957     6 Sheets-Sheet 3

INVENTOR
ROBERT C. RISNER

BY Ogle R. Singleton
ATTORNEY

INVENTOR
ROBERT C. RISNER

Oct. 13, 1959   R. C. RISNER   2,908,527
AUTOMOBILE CARRIERS

Filed April 11, 1957   6 Sheets-Sheet 5

INVENTOR
ROBERT C. RISNER

BY *Ogle P. Singleton*

ATTORNEY

Oct. 13, 1959 R. C. RISNER 2,908,527
AUTOMOBILE CARRIERS
Filed April 11, 1957 6 Sheets-Sheet 6
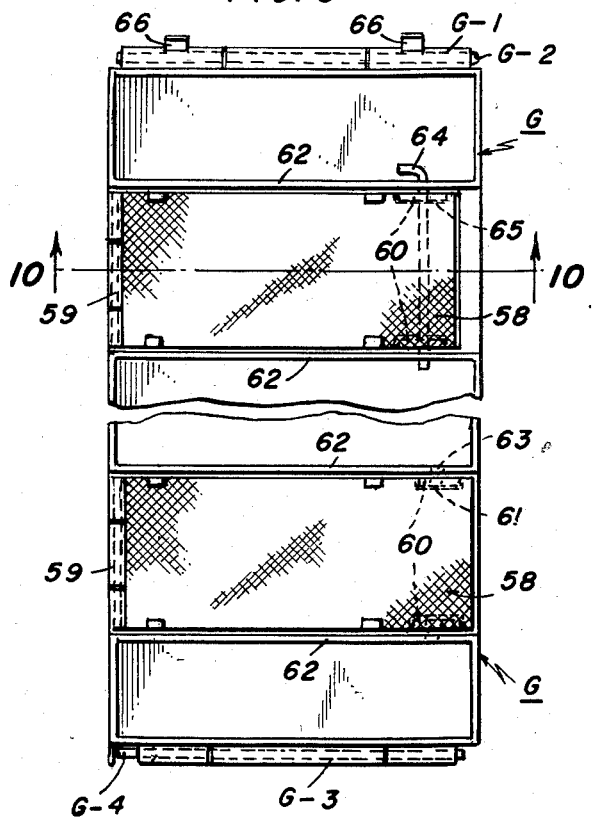
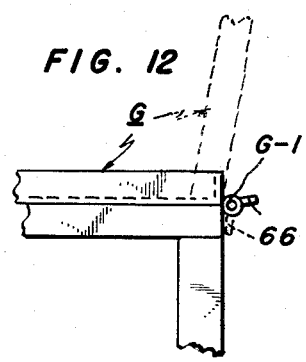
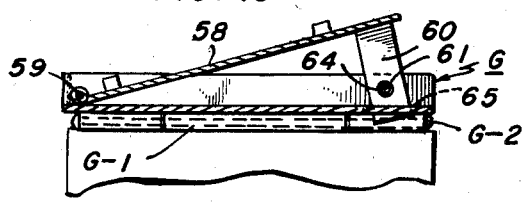
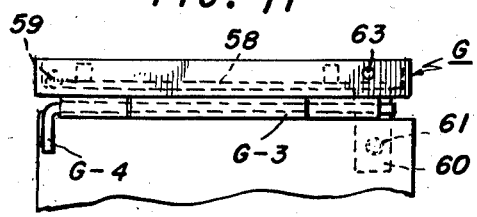
INVENTOR
ROBERT C. RISNER
BY *Ogle R. Singleton*
ATTORNEY 2,908,527
Patented Oct. 13, 1959

2,908,527

AUTOMOBILE CARRIERS

Robert C. Risner, Towson, Md.

Application April 11, 1957, Serial No. 652,222

3 Claims. (Cl. 296—1)

My invention consists in a new and useful improvement in automobile carriers and constitutes a considerable improvement over the carriers disclosed and claimed in my co-pending applications Serial Number 596,006, now Patent No. 2,856,088 and Serial Number 609,125, now Patent No. 2,860,910. The carrier hereinafter disclosed and claimed is designed, as are all of my carriers, to carry five automobiles on a single trailer. The improved features hereinafter disclosed and claimed are: (1) a sectional intermediate trackway having a plurality of hinged portions capable of depression when the cars have been loaded thereon; (2) means for adjusting these hinged portions; (3) resilient supporting means for these portions; (4) means for locking the portions in adjusted positions; and (5) adjustable wheel-wells to accommodate cars of differing wheelbase lengths and tires of differing diameters.

I have found, by actual experience in the use of my improved carrier, that a carrier embodying the aforesaid improved features is capable of carrying five automobiles of considerably larger size than those for which my previous carriers were designed with considerably greater economy of loading space required.

While I have illustrated in the drawings and hereinafter fully described one specific embodiment of my invention, it is to be distinctly understood that I do not consider my invention to be limited to said embodiment but refer for its scope to the claims appended hereto.

In the drawings:

Fig. 9 is a top plan of the rear gate, parts being broken away.

Fig. 10 is a vertical section on the line 10—10 of Fig. 9, in the direction of the arrows.

Fig. 11 is an end elevation of the gate.

Fig. 12 is a fragmentary detail of the gate hinge.

Figure 1:
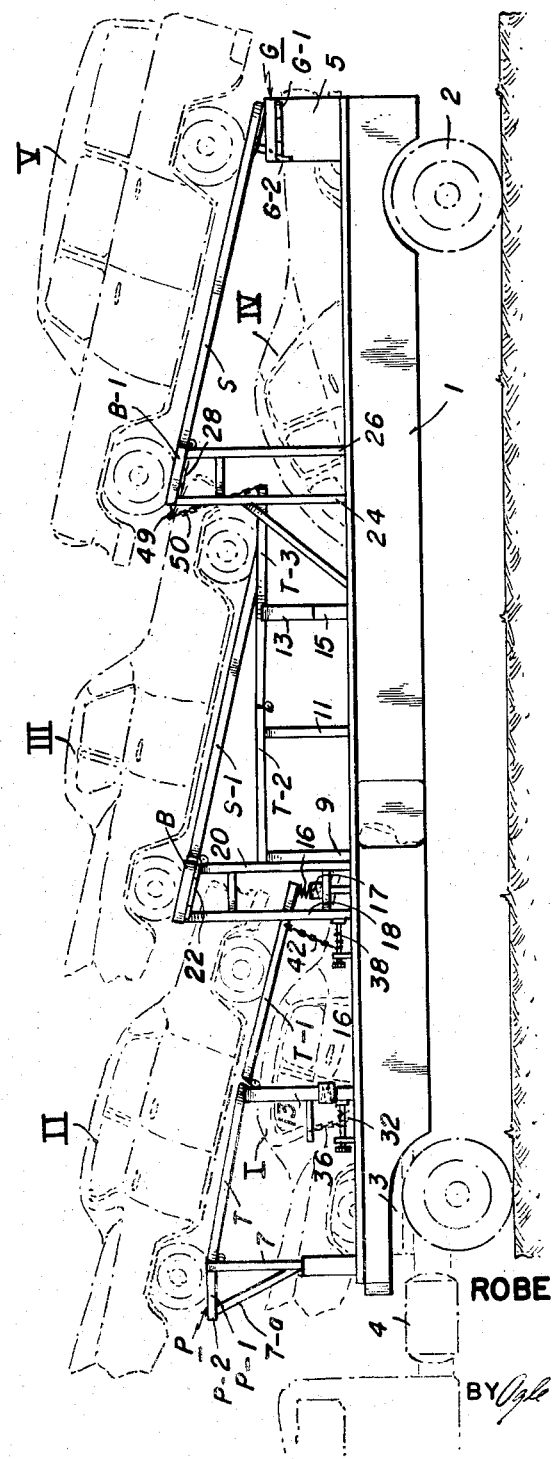
Fig. 1 is a side elevation of my improved carrier fully loaded with five cars.

As shown in the drawings, my improved carrier has a chassis 1 supported at its rear end by ground wheels 2 and at its front end by the usual coupling 3 of a tractor 4. The chassis 1 has the suitable trackway (not shown) customary in such vehicles. Walls 5 and 6 extend upwardly from the sides of the chassis 1, respectively, at the rear end.

A gate G (Figs. 1 and 2) is mounted on the upper edge of wall 5 by a hinge G–1 with a removable pintle pin G–2 and mounted on the upper edge of the wall 6 by a hinge G–3 with a removable pintle pin G–4.

Posts 7 and 8 extend upwardly from the sides of the chassis 1, respectively, at its front end. A platform P is mounted on the posts 7 and 8 and is braced by struts 7–a and 8–a. The platform P has upstanding, lateral flanges P–1 and an end flange P–2.

Figure 8:
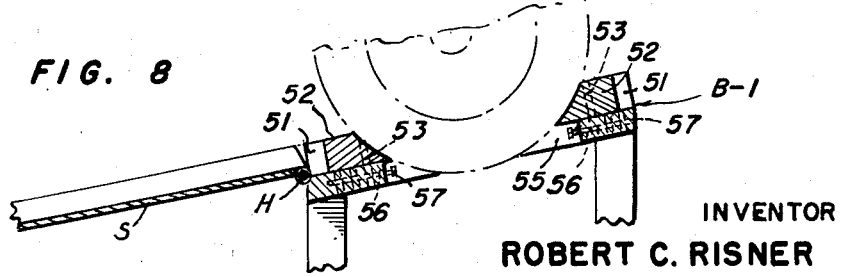
Fig. 8 is a vertical section on the line 8—8 of Fig. 7, in the direction of the arrows.

Between the gate G and the platform P (Fig. 1) there extends an intermediate trackway composed of the following elements: (1) a portion T hinged to the platform P, (2) a portion T–1 hinged to the portion T, (3) a portion T–2 mounted on posts 9, 10, 11 and 12 extending upwardly from the sides of the chassis 1 (Figs. 1 and 5), (4) a portion T–3 hinged to the portion T–2, and (5) removable skids S (Figs. 1 and 2) connecting the portion T–3 with the gate G, and having on their forward ends hinge members H (Fig. 8).

The portions T and T–3 are resiliently supported by arches 13 carried by coil springs 14 on posts 15 extending upwardly from the sides of the chassis 1. The rear end of the portion T–1 is resiliently supported by springs 16 and posts 17 on the sides of the chassis 1.

Two pairs of posts 18, 19, 20 and 21 extend upwardly from the sides of the chassis 1, adjacent the point of junction of the portions T–1 and T–2 of the intermediate trackway. A bridge B is mounted on posts 18 and 20 by a hinge 22 with a removable pintle pin and on posts 19 and 21 by a hinge 23 with a removable pintle pin.

Figure 2:
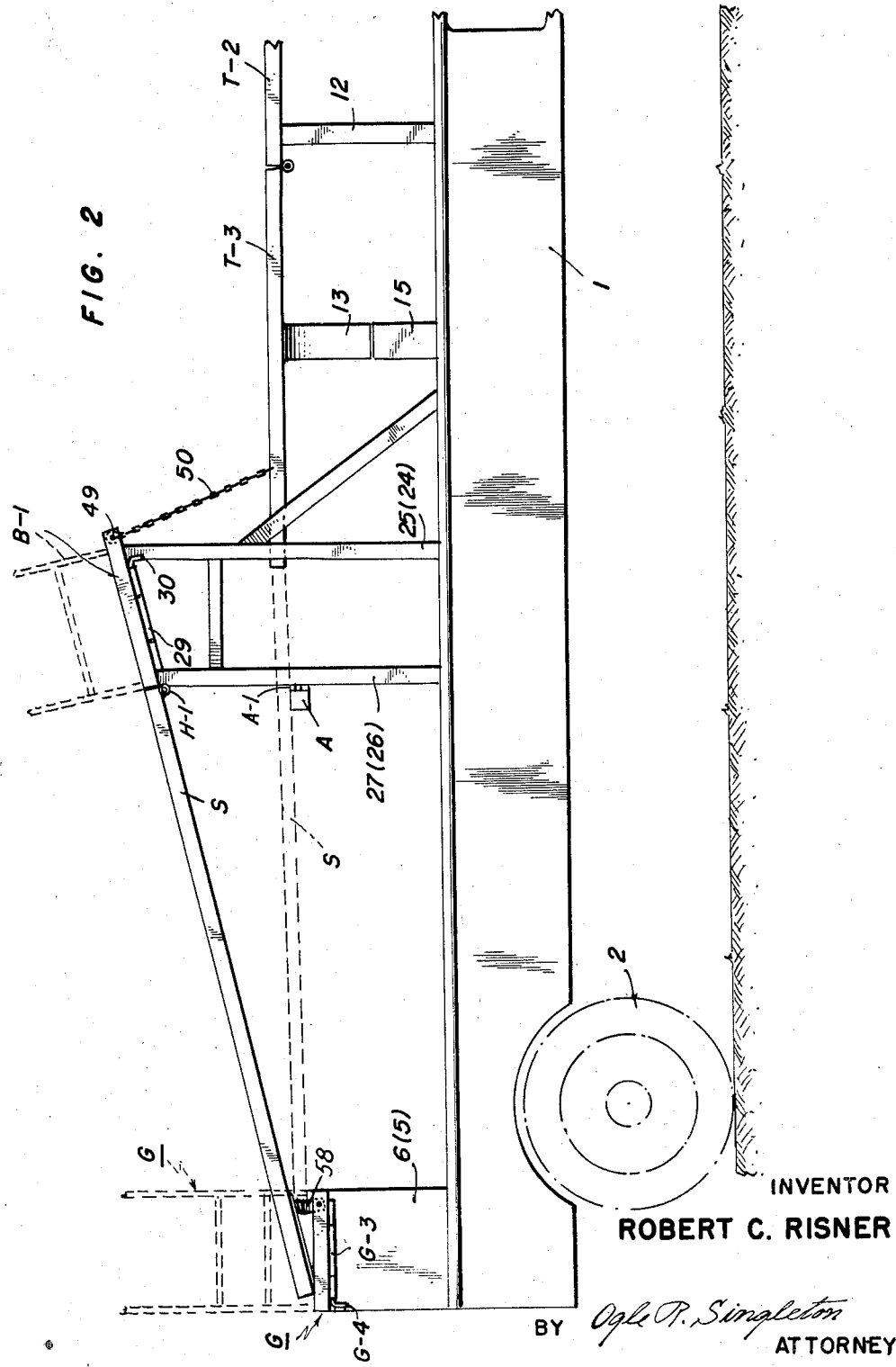
Fig. 2 is an enlarged fragmentary side elevation of the rear part of the carrier, viewed from the side opposite that shown in Fig. 1.

Two pairs of posts 24, 25, 26 and 27 extend upwardly from the sides of the chassis 1, adjacent the point of junction of the portion T–3 and the skids S. A pair of abutments A are pivotally mounted on the posts 26 and 27, respectively, to support skids S adjacent the portion T–3. Each abutment A is carried by a vertical pintle pin A–1 on the post, and is so positioned as to be swingable inwardly between the posts 26 and 27 to support skids S, and outwardly to clear the trackway. A bridge B–1 is mounted on posts 24 and 26 by a hinge 28 with a removable pintle pin and on posts 25 and 27 by a hinge 29 with a removable pintle pin 30 (Fig. 2). The bridge B–1 has on its rear edge hinge members H–1 (Fig. 2) co-acting with the hinge members H on the skids S (Fig. 8).

Figure 3:
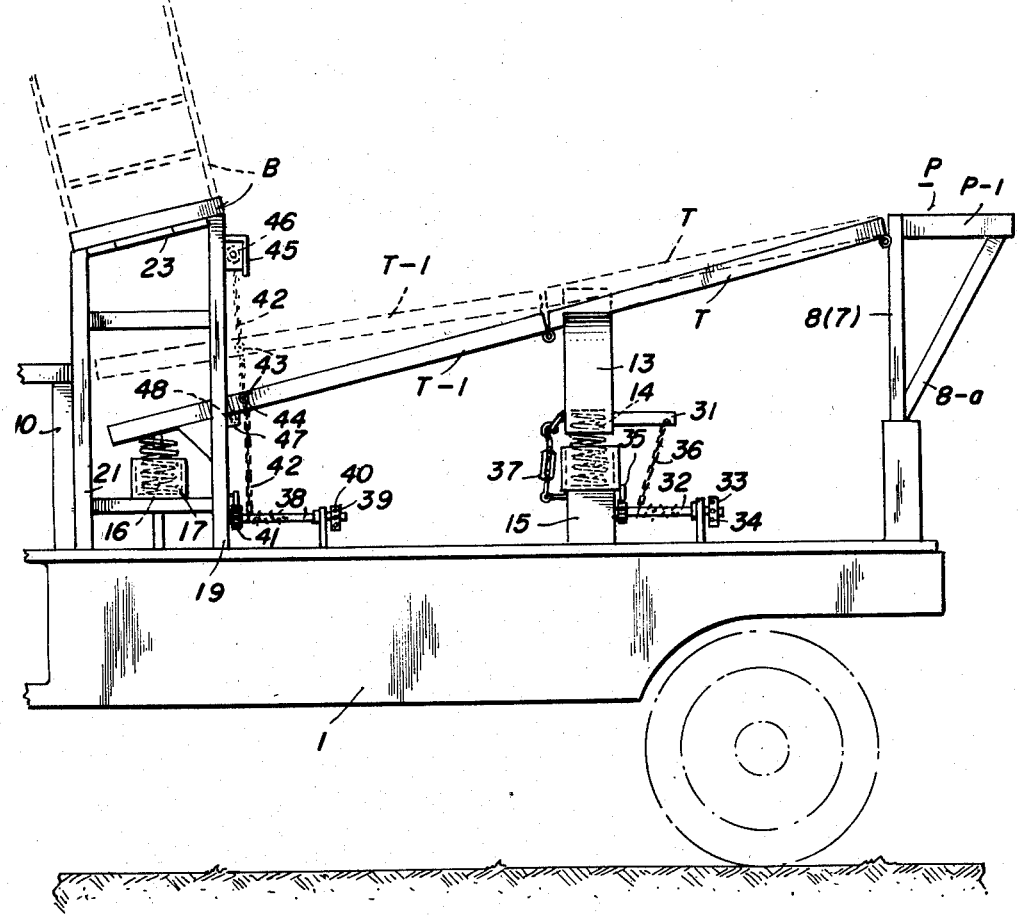
Fig. 3 is a similar view of the forward part of the carrier.

The arch 13 of the hinged portion T is provided with two depressing means on the sides of the chassis 1, respectively (Figs. 1 and 3), each of which comprises a horizontal post 31 extending from the arch 13, a shaft 32 journalled on the chassis 1 and having rotating means such as a head 33 with sockets 34 for insertion of an operating handle and a suitable ratchet latch 35, and a chain 36 wrapped about the shaft 32 and attached to the post 31. Adjacent each depressing means, there is a removable turn-buckle 37 for locking the arch 13 and its post 15 in adjusted position.

The hinged portion T–1 of the intermediate trackway is provided at its rear end with a vertically adjusting means on each side of the chassis 1 (Figs. 1 and 3), each of which comprises a shaft 38 journaled on the chassis 1 and having rotating means such as a head 39 with sockets 40 for insertion of an operating handle and a suitable ratchet latch 41, and a chain 42 wrapped about the shaft 38 and having a ring 43 on its free end. There is a pin 44 on the portion T–1 with which the ring 43 can be engaged. A bracket 45 is suitably mounted on a post for the bridge B and has a roller 46 over which the chain 42 can be passed and then attached by ring 43 to pin 44. When the chain 42 is extended from the shaft 38 directly to the pin 44, as shown in solid lines in Figs. 1 and 3, and the shaft 38 is rotated, the portion T–1 will be drawn downwardly, compressing the springs 16, and when the chain 42 is passed over the roller 46 and attached to the pin 44 as shown in broken lines in Figure 3, and the shaft 38 is rotated, the portion T-1 will be drawn upwardly, urged thereto by the springs 16.

Two suitable sockets 47 are mounted on the posts of the bridge B and stops 48 are mounted on the sides of the portion T-1 to co-act to stabilize the portion T-1 when in its depressed position.

Figure 4:
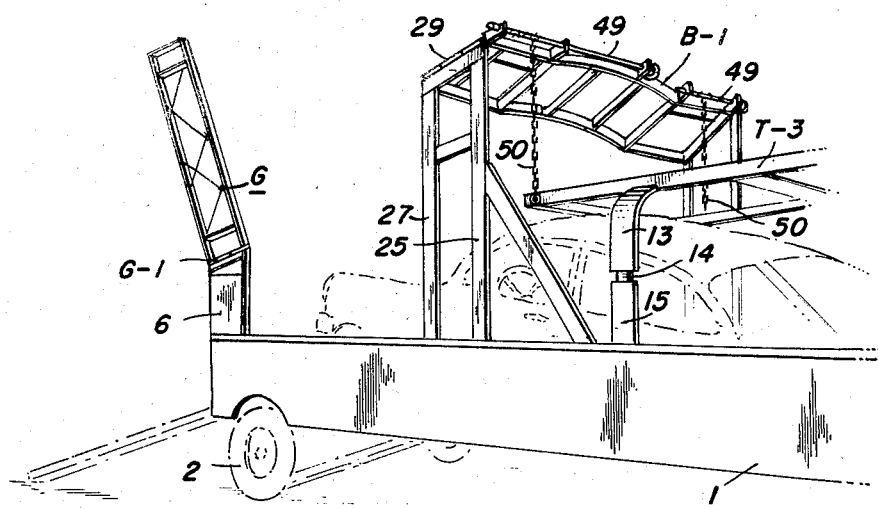
Fig. 4 is a fragmentary perspective of the rear part of the carrier, parts being differently positioned.

The hinged portion T-3 of the intermediate trackway is provided at its rear end with two vertically adjusting means on the sides of the chassis 1, respectively (Figs. 1, 2 and 4) each of which comprises a shaft 49 journaled on the forward edge of the bridge B-1 with suitable means for rotation and a ratchet latch (not shown), and a chain 50 wrapped about the shaft 49 and having its free end attached to the portion T-3.

The portion T-3 has a pair of skids S-1 hinged thereto and adapted to be attached to the rear edge of the bridge B by any suitable means such as is disclosed in my co-pending application, Serial Number 596,006.

Figure 7:
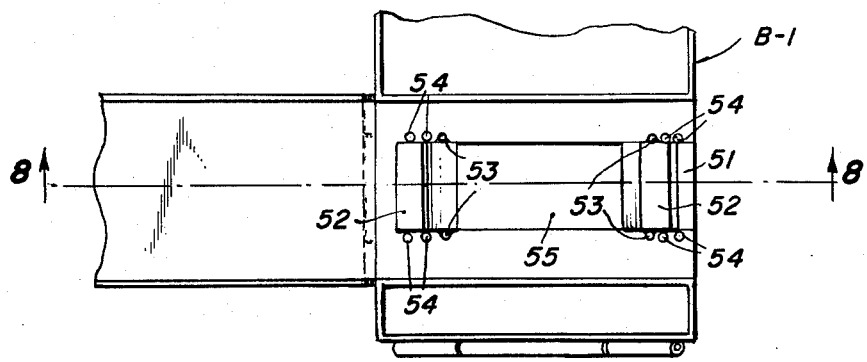
Fig. 7 is a fragmentary top plan of a portion of the rear bridge.

The bridge B-1 is provided with two adjustable wheel-wells (Figs. 7 and 8), each of which comprises a transverse groove 51 in the bridge B-1 in which is disposed a pair of reversely curved wheel-blocks 52. Each block 52 has a pair of lateral tongues 53 on its sides, respectively, for insertion into registering vertical bores 54 in the bridge B-1. The bridge B-1 has a cut-away opening 55 below each groove 51. Horizontal bores 56 are provided in the lower part of the bridge B-1, extending from the opening 55 through the bores 54 to permit cotter-pins 57 to be inserted through the tongues 53 in the bores 54 to hold the blocks 52 in position when the bridge B-1 is opened.

The gate G (Figs. 9, 10 and 11) is provided with two bearing plates 58 (Fig. 9). The plates 58 are so mounted on the top of the gate G as to be aligned with the intermediate trackway. Each plate 58 is mounted by a hinge 59 at the rear edge of the gate G and has at its forward end a pair of tongues 60 with bolt holes 61. The gate G has a pair of flanges 62 at its sides of each of the plates 58 with suitable bolt holes 63. When a plate 58 is swung upwardly (Fig. 10) it can be locked in raised position by a bolt 64 passed through registering holes 61 and 63. Suitable slots 65 are provided in the gate G for the tongues 60 to pass therethrough when the plates 58 are in retracted positions.

All of the hinges for the gate G and the bridges B and B-1 are provided with stop lugs 66 to limit the opening movement thereof (Fig. 12).

It is to be understood that the gate G and the bridges B and B-1 are equipped with suitable hydraulic means for raising and lowering same.

It is to be understood that the portions T, T-1, T-2 and T-3 and the skids S and S-1 have lateral upstanding flanges, and that a pair of skids (not shown) similar to the skids S are provided to extend from the ground on which stands the carrier to the lower trackway on the chassis 1 and to the top of the gate G when it is closed.

Having described the details of construction of my improved carrier, I will now describe its use and operation.

The gate G and the bridges B and B-11 are raised. Portions T, and T-1 are raised by chains 42 to register with portion T-2, and the portion T-3 is raised by chains 50. Car I is backed up onto the lower trackway, moved to the front end of the trackway and dogged down. Gate G is lowered, with its plates 58 in lowered position and the skids S are placed to extend from the gate G to the brackets A which have been moved inwardly. Car II is backed up onto the gate G, along skids S, portion T-3 which is held up by chains 50, portion T-2, portion T-1 which is held up by chains 42, and portion T, until its rear wheels rest on the platform P and are dogged down. Portions T and T-1 are drawn down until portion T-1 barely clears the top of car I. The front wheels of Car II are dogged down. Bridge B is lowered and skids S-1 are swung upwardly from portion T-3 and attached to bridge B. Car III is backed up onto gate G, along skids S, onto portion T-3 and up skids S-1 until its rear wheels rest on bridge B and are dogged down. Portion T-3 is lowered by slacking chains 50 until its arch 13 is received on its posts 15. The front wheels of car III are dogged down. Skids S are removed. Gate G is raised. Car IV is backed up onto the lower trackway, moved forwardly until its top barely clears the rear end of portion T-3 and is dogged down. Bridge B-1 and gate G are lowered. Plates 58 are locked in raised position. Skids S are slidably mounted on plates 58 to extend from plates 58 on gate G to bridge B-1 and fastened thereto by hinge members H and H-1. Car V is driven forwardly up onto gate G and along skids S until its front wheels rest in the wheel-wells in bridge B-1, and is dogged down. The skids (not shown) from the ground to the gate G are removed, and stowed in the trailer. The carrier is now ready to roll.

Figure 5:
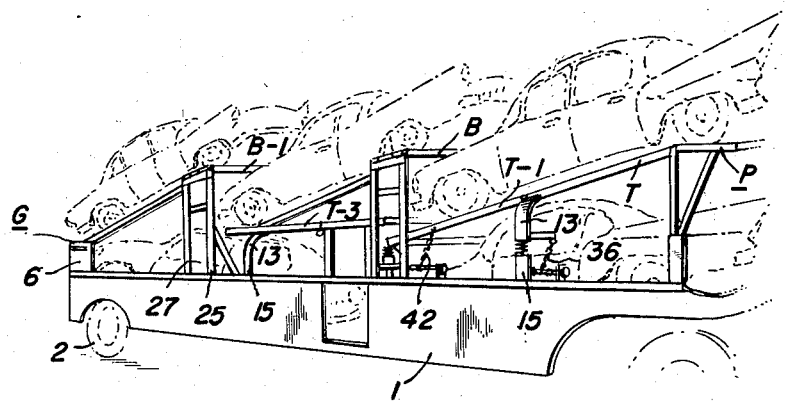
Fig. 5 is a general perspective of the loaded carrier.
Figure 6:
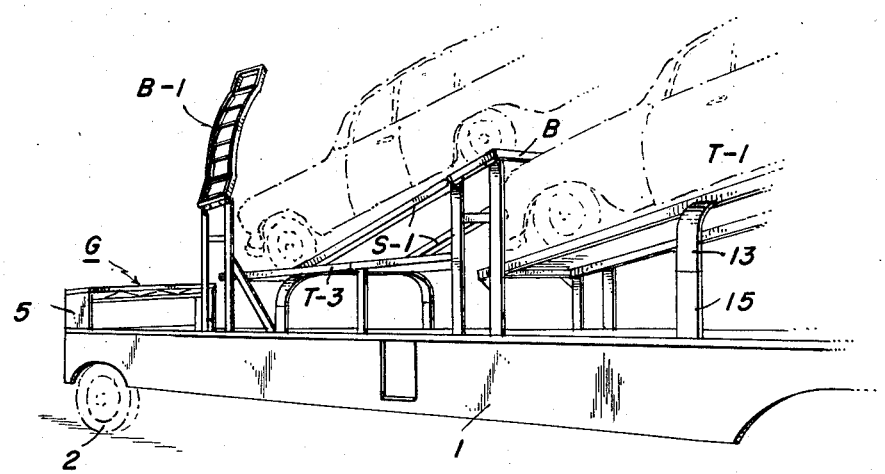
Fig. 6 is a fragmentary perspective of the rear part, similar to Fig. 4, the parts being further differently positioned.

It will be noted (Fig. 1) that if car V is a long car such as a station wagon or truck, it is driven forwardly in loading. However, if car V is a car of the same size body length as the other cars, it may be backed on in loading (Fig. 5).

It is obvious that, by reason of the adjustability of the wheel-blocks 52 of the wheel-wells on the bridge B-1, the wells are adapted to accommodate cars of differing wheel-base lengths, by moving both blocks in each well, or for differing tire diameters by moving one block in each well.

Having described my invention what I claim is:

1. In an automobile carrier, the combination of a chassis; a fixed trackway on said chassis, for loading two automobiles thereon; a platform mounted on the forward end of said chassis; a pair of side walls on the rear end of said chassis; a gate removably mounted on said walls; a second trackway, extending from said platform to said gate, for loading a third automobile thereon, said second trackway having a removable section; a bridge removably mounted on said chassis between said platform and said walls and above said second trackway; a pair of skids removably connecting said second trackway and said bridge, for loading a fourth automobile thereon; and a second bridge removably mounted on said chassis between said first bridge and said walls, and above said second trackway, said removable section being adapted to be removed to connect said second bridge and said gate, to form a third trackway for loading a fifth automobile thereon.

2. An automobile carrier, according to claim 1, in which said second trackway has a section hinged to said platform, a section hinged to said hinged section, a fixed section, and a section hinged to said fixed section, the hinged sections being adapted to be vertically adjusted, and means for adjusting and locking said sections.

3. An automobile carrier, according to claim 1, in which said removable section of said second trackway comprises a pair of skids adapted to be mounted alternatively below said second bridge and on said second bridge to serve alternatively as a section of said second trackway and as said third trackway.

References Cited in the file of this patent

UNITED STATES PATENTS

| | | |
|---|---|---|
| 1,780,277 | Seeley | Nov. 4, 1930 |
| 2,623,759 | Forbas | Dec. 30, 1952 |
| 2,695,810 | Demos | Nov. 30, 1954 |
| 2,750,225 | Mattetal | June 12, 1956 |
| 2,766,898 | Risner | Oct. 16, 1956 |